United States Patent [19]
Stocchiero

[11] Patent Number: 6,120,929
[45] Date of Patent: Sep. 19, 2000

[54] LID FOR ACCUMULATOR BATTERIES AND CHARGING DEVICES CO-OPERATING WITH SAID LID

[76] Inventor: Olimpio Stocchiero, Via Kennedy 5, 36050 Montorso Vicentino (VI), Italy

[21] Appl. No.: 08/817,282
[22] PCT Filed: Oct. 9, 1995
[86] PCT No.: PCT/EP95/03972
   § 371 Date: Apr. 10, 1997
   § 102(e) Date: Apr. 10, 1997
[87] PCT Pub. No.: WO96/11505
   PCT Pub. Date: Apr. 18, 1996

[30] Foreign Application Priority Data

Oct. 11, 1994 [IT] Italy .................................. VI94A0147

[51] Int. Cl.[7] ........................... H01M 2/00; H01M 2/36; H01M 2/38; H01M 2/08
[52] U.S. Cl. ............................... 429/63; 429/74; 429/76; 429/77; 429/78; 429/80; 429/175; 137/260
[58] Field of Search ................ 429/175, 74, 72, 429/76, 80, 63, 64, 77, 78; 137/260, 261, 414; 141/198

[56] References Cited

U.S. PATENT DOCUMENTS

| 1,878,223 | 9/1932 | Woodbridge . | |
|---|---|---|---|
| 1,909,836 | 5/1933 | Kline . | |
| 1,972,962 | 9/1934 | Weber | 137/68 |
| 2,139,476 | 12/1938 | Townsend | 137/68 |
| 2,139,477 | 12/1938 | Townsend | 137/68 |
| 3,062,229 | 11/1962 | Riggs | 137/260 |
| 3,911,972 | 10/1975 | Hubers et al. | 141/7 |
| 4,486,515 | 12/1984 | Chern | 429/72 |
| 4,600,664 | 7/1986 | Cramer et al. | 429/7 |
| 4,696,874 | 9/1987 | Tadiello | 429/64 |
| 4,749,633 | 6/1988 | Elias | 429/64 |
| 4,751,156 | 6/1988 | Stocchiero | 429/64 |
| 5,309,937 | 5/1994 | Rover | 137/260 |
| 5,678,615 | 10/1997 | Hughes | 141/209 |
| 5,731,099 | 3/1998 | Badger et al. | 429/72 |
| 5,803,138 | 9/1998 | Oschmann et al. | 141/198 |

FOREIGN PATENT DOCUMENTS

| 0629010 | 12/1994 | European Pat. Off. . |
| 2423063 | 11/1979 | France . |
| 4225019 | 2/1993 | Germany . |
| 57-025669 | 2/1982 | Japan . |
| 9420994 | 9/1994 | WIPO . |
| 9429907 | 12/1994 | WIPO . |

Primary Examiner—Maria Nuzzolillo
Assistant Examiner—Jonathan Crepeau
Attorney, Agent, or Firm—Watson Cole Grindle Watson P.L.L.C.

[57] ABSTRACT

A lid for accumulator batteries has one or more holes to receive a device to ensure the circulation of electrolyte during the first charge and a second device to ensure the re-fill of electrolyte during the other charges. The lid is equipped with one or more channels each having one end facing the surface of the one or more holes and the opposite end coupled with at least one duct on the inner vertical wall of the container.

10 Claims, 6 Drawing Sheets

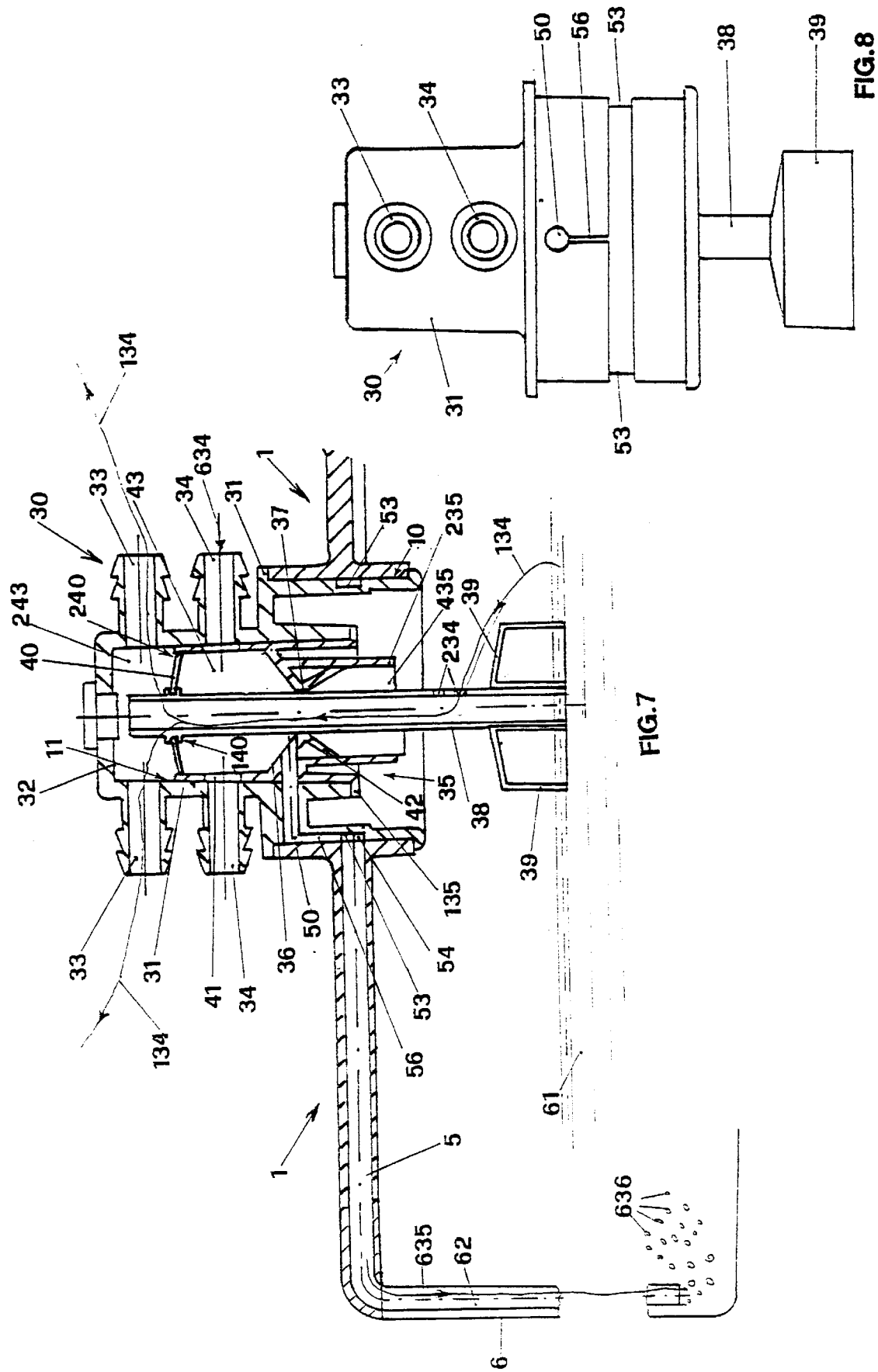

LID FOR ACCUMULATOR BATTERIES AND CHARGING DEVICES CO-OPERATING WITH SAID LID

BACKGROUND OF THE INVENTION

The invention concerns a lid for electric accumulator batteries which is suited to obtain quick charges and devices co-operating with said lid, suited to obtain said quick charges.

It is a known fact that the electric accumulator batteries undergo a series of charges during their lifespan which are done by connecting their poles with an external source of electric power.

In particular, when the accumulator batteries are new, they undergo a first charge which is done by the manufacturer and which is needed for the formation of the elements. Successively, during their lifespan, they also undergo a plurality of other charges which are done by the user, each of them being suited to restore their best operating conditions.

It is a known fact that the charging process is rather long (8 to 10 hours approx.) but it can be considerably shortened by performing the charge with suitable expedients. For instance, it is a known fact that the time to perform the first charge for the formation of the elements can be considerably shortened, if the charge itself is done by using electrolyte at low density kept at a constant temperature by means of an external recycling process in a cooling closed circuit.

With regard to the successive charges which are performed during the lifespan of the accumulator battery, these can also be accelerated if while they are performed, air under pressure is let into the accumulator battery, since air under pressure, by causing the electrolyte to bubble, prevents its stratification.

By operating with such expedients, the charging and recharging times are considerably shortened.

SUMMARY OF THE INVENTION

There are some known devices which are applied to the accumulator batteries and which perform the recycling of the electrolyte and its simultaneous cooling inside the accumulator battery, thus allowing the user to quickly perform the first charge for the formation of the elements. Such devices belonging to the known technique present, however, the inconvenience that the inlet of the electrolyte occurs through the upper part of the container and, consequently, the recycling process mostly affects the upper layers of the electrolyte rather than the layers in the middle position or near the bottom.

With regard to the maintenance re-charges of the accumulator battery which are performed by the user during the lifespan in the accumulator battery itself, there are some known devices which permit the blowing of air inside the accumulator battery during the re-charging operation, thus preventing the stratification of the electrolyte. Such devices belonging to the known technique essentially consist of a vertical tube which penetrates into the accumulator battery until it is near the bottom and through which air is blown in by means of a terminal sleeve attached to the lid.

One limit that such devices present is that they only allow the blowing of air but they do not also allow the re-filling of the electrolyte which is always necessary during the re-charging operations. It is understood that such an operating method implies rather long performing times.

The purpose of the present invention is to the overcome the mentioned inconveniences.

The first purpose of the present invention is to obtain a lid for accumulator batteries to which it is possible to apply a first device which permits the cooling and the closed-circuit circulation of the electrolyte outside the accumulator battery that affect the whole mass of the electrolyte itself, so as to quickly perform the first charge for the formation of the elements.

Another purpose of the present invention is to obtain a lid for accumulator batteries to which it is possible to apply a second device which permits the blowing of air into the accumulator battery, so as to quickly perform also the maintenance re-charges during the lifespan of the accumulator battery.

Another purpose is that said second device also permits the re-filling of the electrolyte.

Not the last purpose is that the lid according to the invention and the devices applicable to it and suited to perform such quick charges, also permit the discharge of the fumes which develop during the charges themselves and their conveyance to the outside.

The described purposes are achieved by a lid for accumulator batteries which, in accordance with the main claim presents, on its essentially flat surface, one or more holes each suited to receive a first device to ensure the circulation of the electrolyte during the first quick charge for the formation of the elements and a second device to ensure the re-fill of the electrolyte and the other quick charges during the lifespan of the accumulator battery and is characterized in that it is equipped with one or more channels made in said surface, each of them presenting one end facing the cylindrical surface of said one or more holes and the opposite end coupling with a duct present on the inner vertical wall of the container of the accumulator battery which said lid matches, said duct ending near the bottom of said container.

Said first device is characterized in that it comprises a body having a suitable shape so as to be inserted into one of said one or more holes of said lid, said body presenting:

a first way to let the electrolyte into the accumulator battery, said first way presenting one end connected with a pipe for the inlet of said electrolyte and its opposite end communicating with an annular recess made in the body of said first device and communicating with the corresponding end of each one of said first channels;

a second way to let the electrolyte flow out of the accumulator battery, said second way presenting one end connected with a pipe for the discharge of said electrolyte liquid and its opposite end protruding inside said container and suited to maintain by overflow the level of electrolyte inside the accumulator battery.

DESCRIPTION OF THE INVENTION

Said second device comprises:

a body which can sealingly be coupled within one of said one or more holes of said lid of an electric accumulator battery and which presents a cavity provided with a bottom, said body presenting one or more first ducts for exhausting the fumes and one or more second ducts for the inlet of the re-fill liquid;

a tubular element which presents an outer tubular part which couples within said cavity of said body and a cylindrical guiding element innerly co-axial within said outer tubular part, said tubular element being provided, in its interior and in its middle positions, with a transversal surface equipped with a through hole and, laterally on the cylindrical wall, with one or more through openings communicating with at least one of said one or more second ducts belonging to said body;

a tubular stick slidingly coupled within said through hole of said transversal surface and presenting, at one end, a floating body co-operating with the liquid contained in the accumulator battery and, at the opposite end, a flexible membrane connected with said tubular stick through first sealingly locking means and connected with the inner lateral surface of said tubular element through second sealingly locking means, said tubular stick being provided, in its essentially middle position, with closing means suited to sealingly co-operate with said hole of said transversal surface, so as to allow or to prevent the passage of the re-fill liquid coming from said one or more second ducts, said flexible membrane defining a discharge chamber inside one side of said cavity of said body, which communicates with said one or more first ducts and with the end of said tubular stick and, on the opposite side, a build-up chamber for the collection of the re-fill liquid which communicates with said one or more second ducts and within which, the pressure of said liquid contained in it, causes the deformation of said membrane, thus producing on said tubular stick a force such as to increase the pressure exerted on said closing means by said floating body, and is characterized in that said build-up chamber communicates with a duct equipped with a capillary section joining an annular recess present on the outer surface of said body, said annular recess defining, together with the wall of the hole lodging said device, an annular chamber which communicates with said tubular channel of said lid, said capillary section preventing the passage of electrolyte from the build-up chamber to said channel but permitting the passage of compressed air which is let into said second inlet duct of said device during the re-charging process of the accumulator battery.

Further scope of applicability of the present invention will become apparent from the detailed description given hereinafter. However, it should be understood that the detailed description and specific example, while indicating a preferred embodiment of the invention, are given by way of illustration only, since various changes and modifications within the spirit and scope of the invention will become apparent to those skilled in the art from this detailed description and from the drawings, wherein:

FIG. 7 shows in a cross-section the second device according to the invention suited to be applied on the lid, also being the object of the present invention, in order to allow the subsequent re-charging and re-filling operations;

FIG. 8 shows an external view of said second device represented in FIG. 7;

Figure 1:
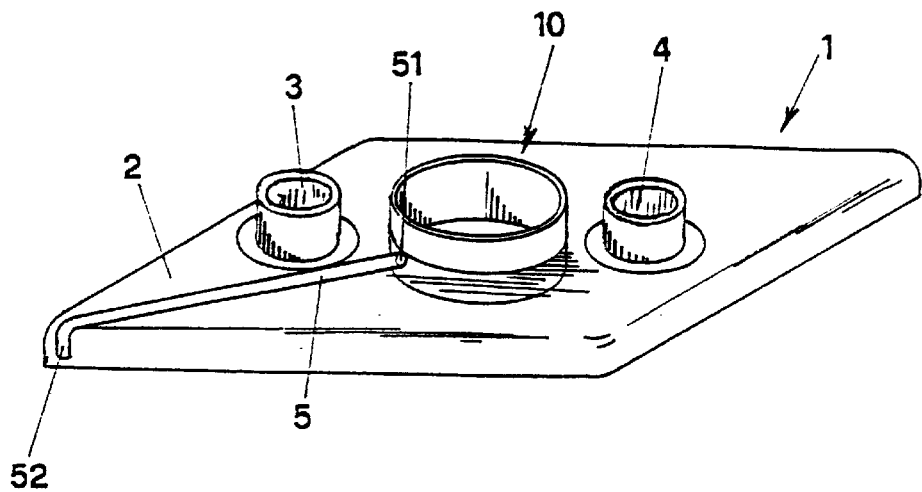
FIG. 1 shows in an axonometric representation the lid according to the invention.

The lid for accumulator batteries, object of the present invention, is represented in FIG. 1 wherein it is indicated as a whole with 1 and wherein it can be observed that it comprises an essentially flat surface 2, on which there are a pair of holes 3 and 4 suited to permit the insertion of the poles and another through hole 10 suited to receive the devices for the quick charge, object of the present invention, and which will be described hereinafter.

Figure 2:
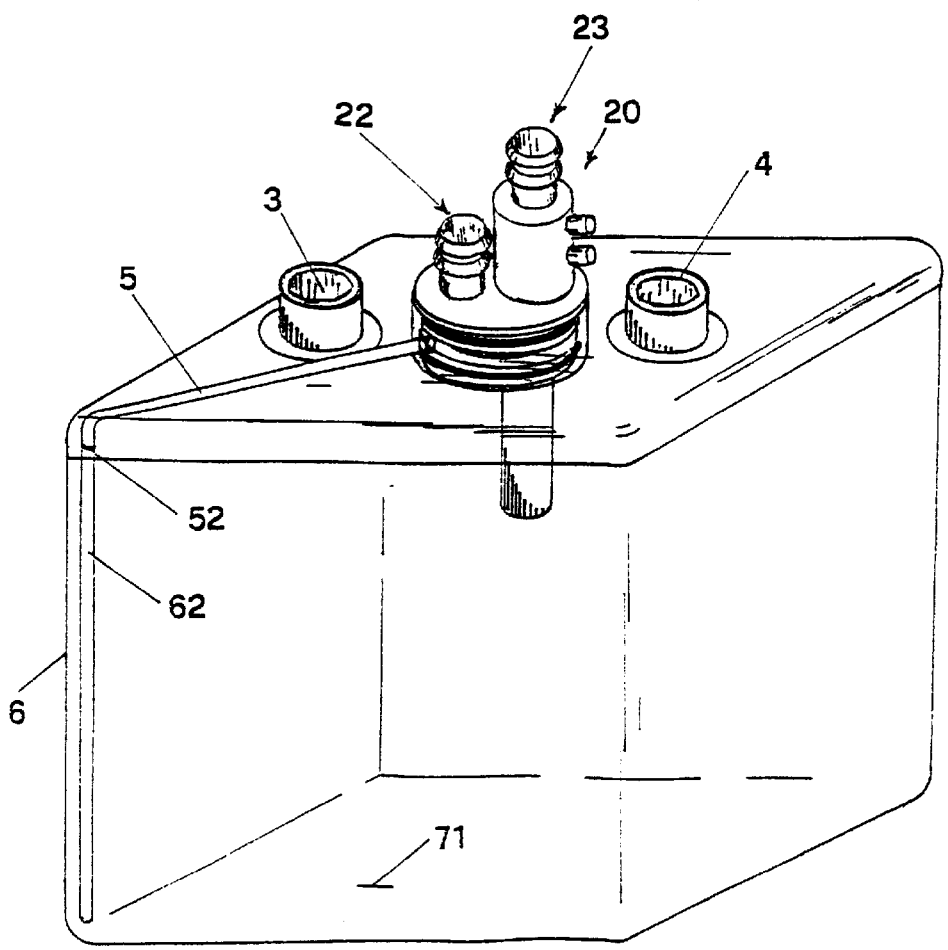
FIG. 2 shows the lid of FIG. 1 applied to the container of an accumulator battery and equipped with the first device suited to ensure the circulation of electrolyte during the first quick charge for the formation of the elements.

In particular, on the surface 2 of said lid 1 it can be observed that there is a channel 5 which presents one end 51 facing the cylindrical surface of said hole 10 and the opposite end 52 coupling with a duct 62 which, as can be observed in FIG. 2, is present on the inner vertical wall of the container 6 of the accumulator battery to which said lid 1 is coupled and which stretches along said inner vertical wall ending near the bottom 71.

It is pointed out that in the Figures and in the descriptions following hereinafter, reference is made to a lid 1 provided with a single through hole 10 suited to receive the device according to the invention and with a single channel 5 to set into communication said hole 10 with the interior of the container 6 of the accumulator battery. Such a description, restricted to a single hole and a single channel, is given by way of illustration only since in different embodiments the lid of the accumulator can be provided with any number of through holes 10 and with any number of channels 5 and, consequently, with a corresponding number of ducts 62.

Figure 4:
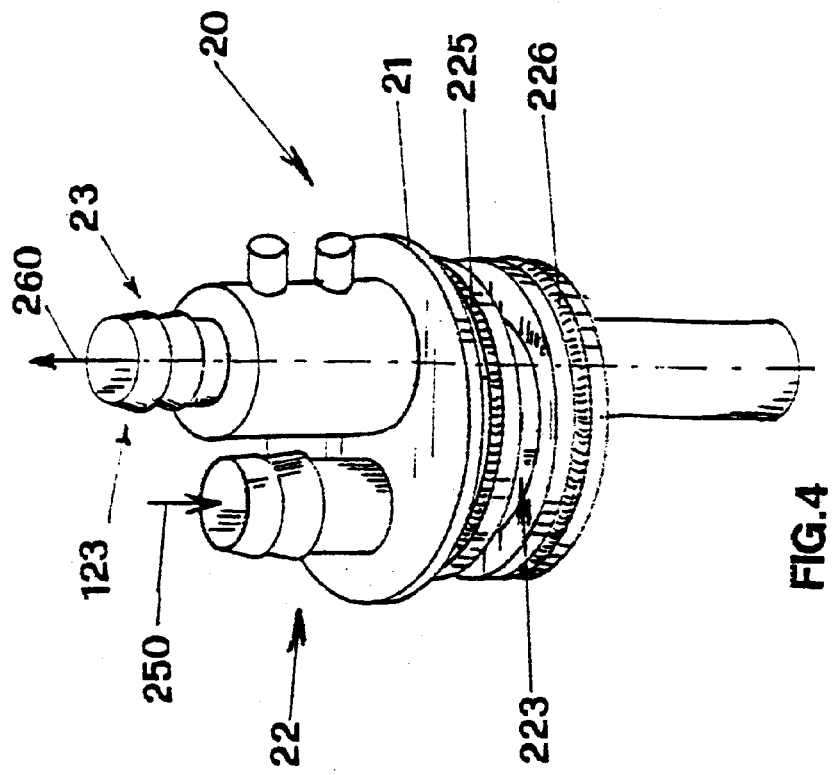
FIG. 4 shows in an axonometric representation the first device according to the invention of FIG. 3.
Figure 3:
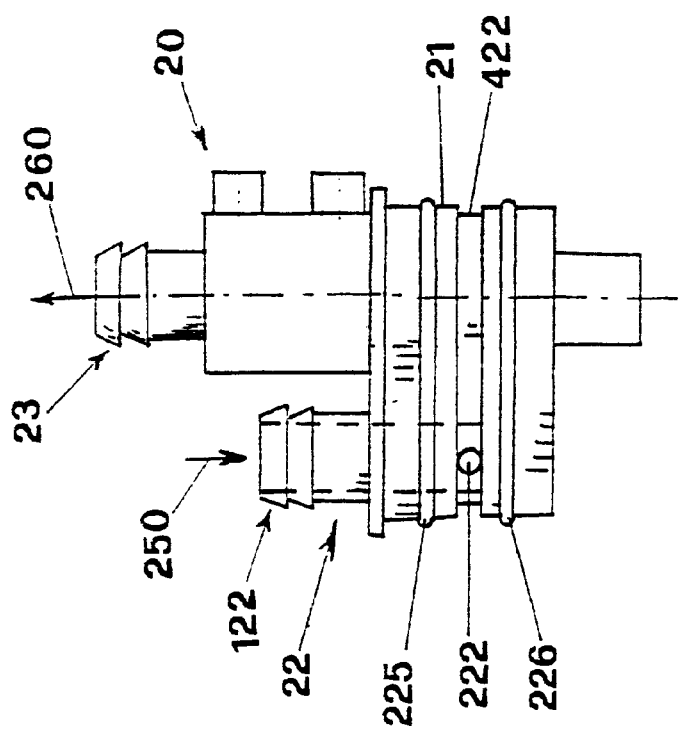
FIG. 3 shows in an external front view the first device according to the invention.
Figure 5:
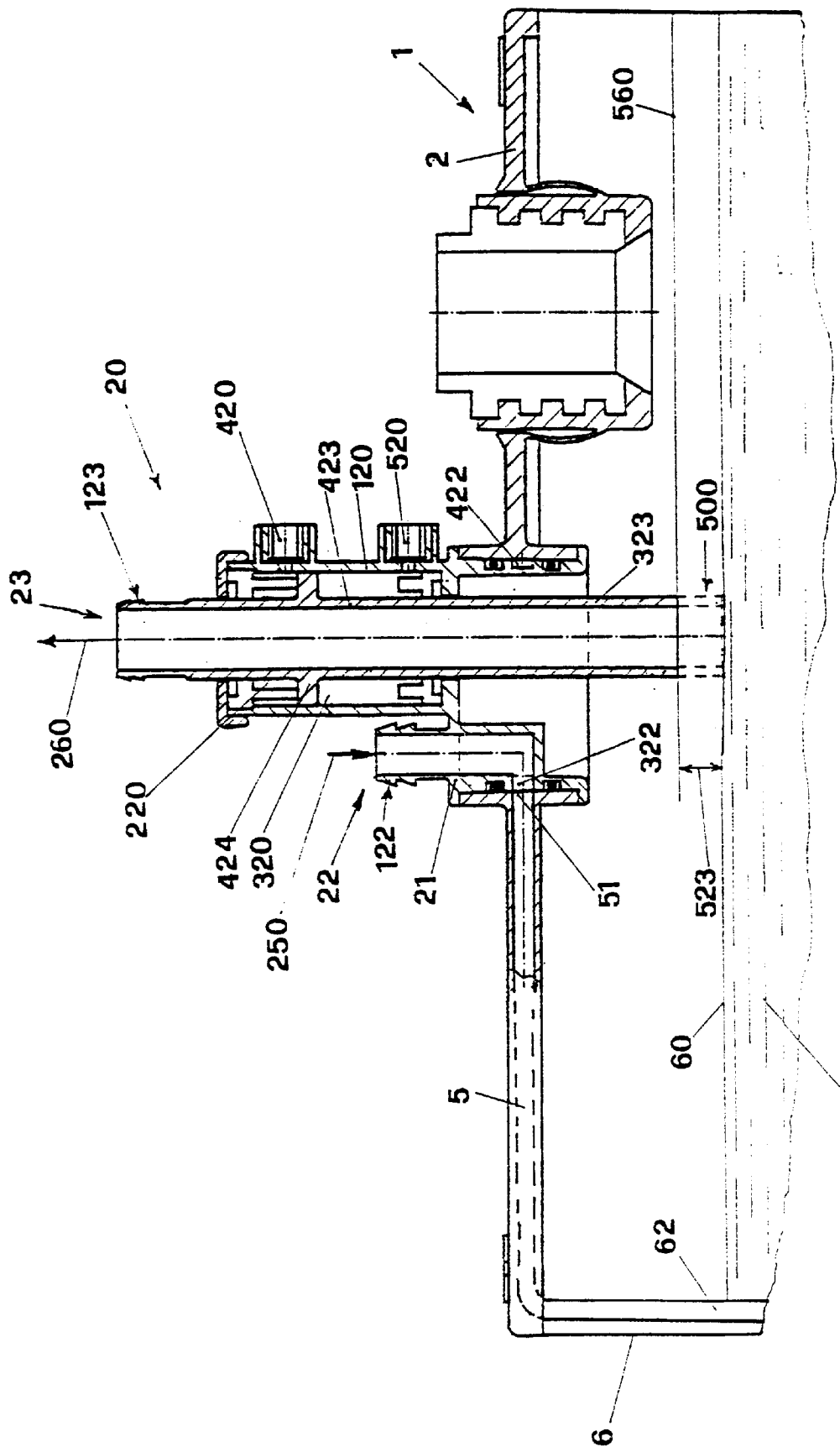
FIG. 5 shows the lid according to the invention and the first device matching it which ensures the inlet and the recycling of electrolyte.

As can be observed in FIG. 2 and in better detail also in FIG. 5, a first device, indicated as a whole with 20, also visible in the drawing representations of FIG. 3 and FIG. 4, is applied to the lid 1. Said device permits to ensure the circulation of electrolyte during the first quick charge for the formation of the elements of the accumulator battery, which is performed by the manufacturer.

In fact, it has been said that in order to obtain the first charge of the accumulator battery for the formation of the elements in a quick way, the known technique foresees the connection of the poles of the accumulator battery to an external source of electric power, while performing at the same time, a recycling process of electrolyte inside a closed circuit, equipped with a cooling system suited to keep constant the temperatures of electrolyte during the charging process. In order to accelerate such a charging process, it is also necessary to use electrolyte with a low concentration which is let into the accumulator battery until it reaches a level which is lower than the predetermined final level. When the charging process has essentially been completed, a certain amount of highly concentrated electrolyte is added, so as to reach, inside the accumulator battery, both the level of electrolyte and the concentration which have been predetermined.

For this purpose the process of quick charge is divided into two phases and, precisely: a first phase when the charge is obtained with the recycling of electrolyte with a low concentration, and a second phase when the electrolyte at high concentration is let into the accumulator battery. For this reason the first device object of the present invention, indicated as whole with 20, is used. The same, as can be observed in the FIGS. 3, 4 and 5, comprises a body 21, having a suitable shape so as to be sealingly inserted into said hole 10 of said lid 1, which presents a first way 22 for the inlet of electrolyte following the direction 250 and a second way 23 for the outlet of electrolyte itself following the direction 260, wherein said ways are connected with an external circulating system which will be described hereinafter.

Figure 6:
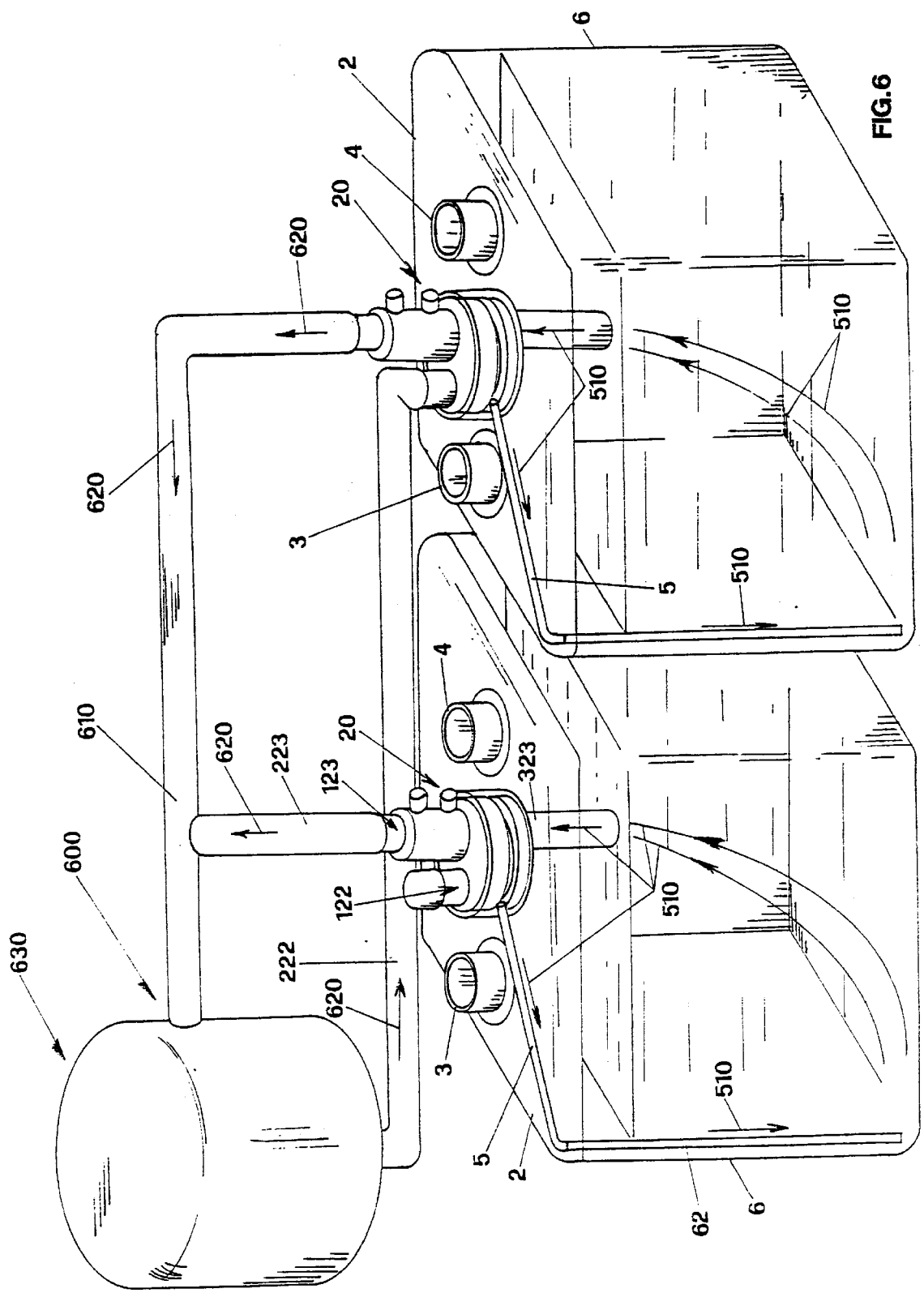
FIG. 6 shows the two accumulator batteries equipped with the lid according to the invention and with their corresponding first device to ensure the circulation of electrolyte, both said first devices being connected with the external recycling and cooling circuit.

It can be observed, in particular, that said first way 22 presents one end 122 connected with a feeding pipeline 222 represented in FIG. 6 and belonging to said external recycling unit, indicated as a whole with 600, while the opposite end 322 communicates with an annular recess 422, made in the body 21 of said first device 20, which through said channel 5 and said vertical duct 62 communicates with the interior of the container 6 of the accumulator battery, near the bottom 71.

With regard to said second way 23, this presents one end 123 connected with an overflow pipe 223 which, as can be observed in FIG. 6, belongs to the same circuit 600 for the external circulation of the electrolyte and the opposite end 323 which protrudes inside said container 6. Said second way 23 consists of a tubular element 423 which presents, in its middle position, an annular area having a larger diameter 424, slidingly coupled inside a chamber 120 belonging to said body 21 of said first device 20. Said annular area having a larger diameter 424 defines, inside said chamber 120, an upper area 220 and a lower area 320 separated from one another, each of them presenting an opening 420 and 520 respectively, which permits the inlet or outlet of air under pressure in their respective chambers. In order to perform in a quick way the charge for the formation of the elements, the first device 20 is coupled with the hole 10 of the lid 1, making sure that it seals it by means of the interference of the OR rings 225 and 226 belonging to it, against the wall of said hole 10. Through the opening 420 of said first device 20, air under pressure is let in; this acts on the larger diameter 424 of the tubular element 423 and causes the latter to descend, so that its end 323, as can be observed in FIG. 5, places itself in the position 500 indicated by the dotted line and defines by overflow the level 60 of the electrolyte 61. The electrolyte 61 is a low concentration electrolyte which, by means of the recycling unit 600 and through the pipelines 222, 223 and 610 which connect a plurality of first elements 20 in parallel with one another, is made to circulate in a closed circuit outside the accumulator battery following the direction 620 represented in FIG. 6 and in a closed circuit inside the accumulator battery following the direction 510. The recycling unit 600 comprises, in fact, a pump, a cooling unit and a system for exhausting the fumes, indicated as a whole with 630, which permit not only the forced circulation of electrolyte, but also its cooling so as to keep it at a constant temperature.

During the circulation of electrolyte, all the fumes produced are exhausted, since they follow the flow of electrolyte going out through said second way 23, thus permitting to operate in a healthier environment.

It is obvious that the circulation of electrolyte can also occur following directions opposite to the directions 620 and 510, the same results being achieved.

When the charging process of the accumulator battery is almost completed, air is let in through the opening 520 of the chamber 120 which, by acting on the annular area having a larger diameter 424, vertically lifts the tubular element 423 and spaces out by a length 523 its end 323 from the level 60 of the electrolyte 61.

Through the second way 23, the highly concentrated electrolyte is filled in in such an amount as to determine a new level 560 corresponding to the overflow level of the end 323, as can be observed in FIG. 5. Said concentrated electrolyte which is added, mixes with the low concentration electrolyte 61 already present inside the accumulator battery, bringing the concentration to the required value, carrying on with the final charge of the electric accumulator battery.

Said first device 20 is removed from the hole 10 within which it is lodged, the hole 10 is closed and the accumulator battery can be sent to the user.

It has been seen how, by using the lid 1 and said first device 20 which can be coupled with it, both object of the present invention, it is possible to obtain in a quick way the charge for the formation of the elements of the accumulator battery.

During its use the accumulator battery is liable to discharge and, therefore, from time to time, the user has to carry out the normal periodical maintenance operations which imply re-charging and re-filling with the electrolyte.

In order to carry out such operations, a second device, also object of the present invention, indicated as a whole with 30 in the FIGS. 7 and 8 is applied on lid 1. In FIG. 7 it can be observed that said second device is also coupled with the same hole 10 of lid 1.

It can be observed in particular, that said second device 30 comprises a body 31 which can be sealingly coupled with the same hole 10 of the same lid 1 and is provided with a cavity 11 limited by a bottom 32.

Said body 31 presents laterally one or more first ducts 33 for the exhaust of the fumes, essentially lying on the same plane and one or more second ducts 34 for the inlet of the re-filling liquid, essentially co-planar and lying on a plane placed below the plane on which said first ducts 33 lie and essentially parallel with it.

Said ducts are connected with pipelines, not represented in the Figure, which permit the outlet of the fumes from the accumulator battery and the inlet of the re-fill liquid in the accumulator battery, respectively.

A tubular element 35 is coupled with the body 31 of said second device 30. Said tubular element consists of a tubular outer part 135 which is inserted into said cavity 11 of said body 31 and of a cylindrical guiding element 235 internally co-axial with said tubular outer part 135.

A transversal surface 36 equipped with a through hole 37, is internally and transversally arranged in said tubular element 35 and it rigidly connects with each other said cylindrical guiding element 235 with the body of said tubular element 35.

Moreover, said tubular element 35 presents laterally on its cylindrical wall, one or more through openings 41, each of them communicating with at least one of said one or more second ducts 34 belonging to said body 31, whenever said tubular element 35 is coupled with the body 31 of said second device 30.

The device 30 according to the invention also comprises a tubular stick 38 which is slidingly inserted into said through hole 37 of said transversal surface 36. Said stick 38 presents, at one end, a floating body 39 which co-operates with the liquid contained in the accumulator battery and, at the opposite end, it presents a flexible membrane 40 which is connected with the tubular stick 38 through first sealingly locking means 140 and, at the same time, it is also connected with the inner lateral surface of said tubular element 35 through second sealingly locking means 240. Moreover, said tubular stick 38 is equipped, in its essentially middle position, with closing means consisting of a shutter 42 in the shape of a truncated cone, suited to intercept the through hole 37 of said transversal surface 36.

In order to guarantee the centering of said tubular stick 38 inside the cylindrical guiding element 235 within which it is inserted, said stick is equipped with guiding fins 435 which are slidingly coupled with the inner surface of said cylindrical guiding element 235.

The flexible membrane 40 locating, inside the cavity 11 of said body 31 of said second device 30, on one side, a exhaust chamber 243 which communicates with said one or more first ducts 33 and, on the opposite side, a build-up chamber 43 which communicates with said one or more seconds ducts 34. Moreover, said build-up chamber 43 also communicates with a duct 50 arranged in correspondence with the transversal surface 36 and which presents a capillary section 56 joining an annular recess 53 present on the outer surface of said body 31. Said annular recess 53 defines, with the wall of the hole 10 lodging said second device 30, an annular chamber 54 which communicates with said tubular channel 5 of lid 1.

Figure 9:
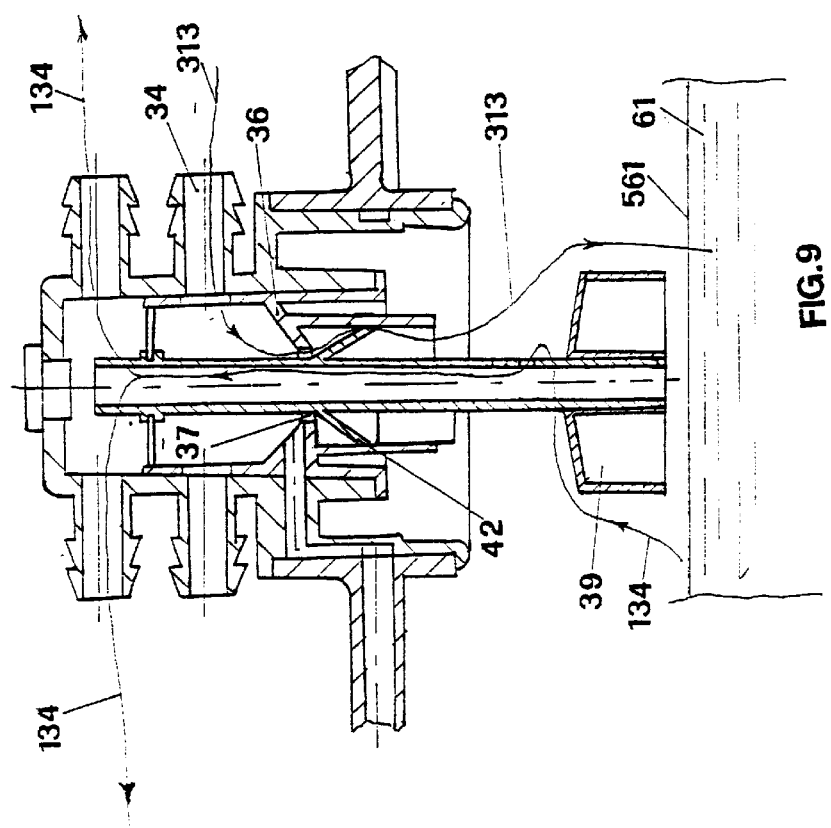
FIG. 9 shows the second device represented in FIG. 7 during the re-filling phase of electrolyte.

Therefore, in order to perform the periodical maintenance operation, consisting of re-charging and re-filling the accumulator battery, after coupling said second device 30 with each of the holes 10 of the accumulator battery, the re-filling of electrolyte is carried out by introducing the re-fill liquid through the second ducts 34, as can be observed in FIG. 9.

Figure 10:
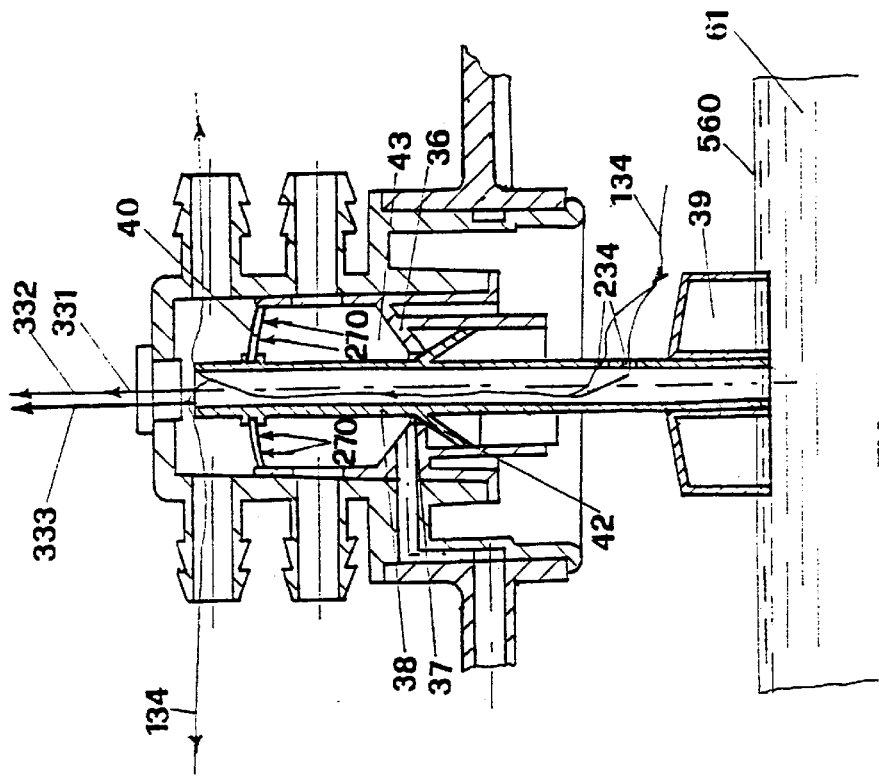
FIG. 10 shows the second device represented in FIG. 7 once the re-filling phase has been completed.

Such a re-fill liquid enters into the accumulator battery following direction 313 passing through hole 37 of the transversal surface 36, until the level 561 of the electrolyte 61 reaches, as can be observed in FIG. 10, the level 560. In such a condition, the floating element 39 is lifted upward so that the shutter 42 of the tubular stick 38 can sealingly close the hole 37 drilled in the transversal surface 36.

When hole 37 is closed, the liquid accumulated inside the build-up chamber 43 produces a pressure 270 against the flexible membrane 40 which causes its deformation, as can be observed in FIG. 10.

Such a pressure, by acting against the surface of the membrane 40, produces a force 332 which follows the same direction as the direction of the force 331 caused by the pushing force of the floating body 39. Therefore, on the stick 38 and, consequently on the shutter 42 belonging to it, a total force 333 is achieved, which closes the through hole 37, said force being stronger than the single force 331 caused by the floating force alone. Such an additional force 332 ensures a perfect closing of the shutter 42, even in case the accumulator battery undergoes vibrations during the re-filling operation. This eliminates any eventual leakages, caused by possible oscillations which are encountered during the re-filling operation by using the re-fill devices belonging to the known technique, and said second device 30 ensures the same sealing effects which are obtained by the automatic re-fill device object of the patent application N. VI94A000139 in the name of the same applicant of the present patent.

It is pointed out that the liquid present inside the build-up chamber 43 cannot go through the duct 50 and from here inside the accumulator battery through the vertical duct 62, since its passage is blocked by the presence of the capillary section 56 connecting said ducts 50 and 5 with one another.

In order to obtain the quick re-charge, through said second ducts 34, air following direction 634 is blown into the build-up chamber 43 which, as can be observed in FIG. 7, through duct 50 and the capillary section 56, reaches channel 5 from which it then flows following direction 635 into the vertical duct 62 present inside the container 6 and from here arrives near the bottom 71. The air 636 inside the electrolyte 61 prevents the stratification of the electrolyte itself and facilitates, therefore, a quick re-charge.

During the re-filling and re-charging operations, the fumes produced flow out following direction 134 passing through the holes 234 drilled in the tubular stick 38 above the floating body 39, going along the tubular stick 38 and then flowing out through said first ducts 33, as can be observed in the FIGS. 7, 8 and 9.

It is pointed out that each element of the accumulator battery can be equipped with a closing cap, in which case, in order to carry out the re-charging operations, it is necessary to insert one of the described devices in each of the holes lodging one of said caps. If, on the other hand, all the elements which form the accumulator battery are equipped with a multiple closing device, only one of the described devices will be used, this feeding all of the caps of the accumulator battery with a single feeding line. On the basis of what has been described, it is understood that the present invention achieves all the proposed purposes.

First of all, the lid and the first device which can be coupled with it forming the object of the present invention, permit to the manufacturer to obtain a quick charge for the formation of the elements, before sending the accumulator battery to the user.

Also, by using the lid and the second device which can be coupled with it, forming the object of the present invention too, the purpose of permitting to the user to perform the quick charges of the accumulator battery and the refill of electrolyte, is also achieved.

Moreover, it has been seen that both said devices applied to said lid also permit, during the quick re-charging operations, the conveyance and exhaust of the fumes which are produced during the re-charge. In this way, it is possible to have a canalization which, by conveying the fumes away from the area where the charge of the accumulator batteries occurs, permits to operate in a less polluted environment.

I claim:

1. A lid for an accumulator battery for communicating with a circulating device for circulating electrolyte into and out of the accumulator, said accumulator being formed with an inner vertical wall and including an upper surface of said lid formed with at least one first hole and one second hole therein; at least one first device for the first hole having a cylindrical sidewall surface for circulation of electrolyte into and out of the accumulator during a first charge; and said at least one second device for the second hole for refilling electrolyte and for subsequent charges of the accumulator, said lid being including a plurality of channels in said upper surface, each channel having a first end and a second end, said first end facing the cylindrical surface of each of said first holes, and at least one duct located on the inner vertical wall of the container having a lower end terminating near the bottom of the container and an upper end coupled to the second end of the channel in said lid and being in registration therewith, said first device comprising a body having a cylindrical side wall formed with an annular recess; and sized so as to be sealably inserted into said first hole for communicating with the channels;

a first pipe and a second pipe;

said body having a first way and a second way, the first way for allowing electrolyte into the accumulator battery, the first way having a first end for receiving electrolyte from the circulating device and a second end for communicating with the annular recess and with the first end of the said channel, and way for allowing electrolyte to flow out of the accumulator battery, the second way having a first end for communicating with the circulating device for discharging electrolyte therefrom, and a second end locatable at a selected level within the container to maintain by overflow a level of electrolyte inside the accumulator battery, and wherein said second way comprises a tubular element slidably located in the chamber having an inner wall forming an annular area therebetween, said tubular element having a annular web for engaging the inner wall, said annular area having an upper area and a lower area separated from one another by said annular web, each having an opening to permit the inlet or the outlet of air under pressure, said openings for selectively permitting vertical displacement of said tubular element whenever said openings are fed by air under pressure acting against said annular web.

2. A lid for an accumulator battery for communicating with a circulating device for circulating electrolyte into and out of the accumulator, said accumulator being formed with an inner vertical wall and including an upper surface of said lid formed with at least one first hole and one second hole therein; at least one first device for the first hole having a cylindrical sidewall surface for circulation of electrolyte into and out of the accumulator during a first charge; and said at least one second device for the second hole for refilling electrolyte and for subsequent charges of the accumulator, said lid including a plurality of channels in said upper surface, each channel having a first end and a second end, said first end facing the cylindrical surface of each of said first holes, and at least one duct located on the inner vertical wall of the container having a lower end terminating near the bottom of the container and an upper end coupled to the second end of the channel in said lid and being in registration therewith, said first device comprising a body having a cylindrical side wall formed with an annular recess; and sized so as to be sealably inserted into said first hole for communicating with the channels;

a first pipe and a second pipe;

said body having a first way and a second way, the first way for allowing electrolyte into the accumulator battery, the first way having a first end for receiving electrolyte from the circulating device and a second end for communicating with the annular recess and with the first end of the said channel, the second way for allowing electrolyte to flow out of the accumulator battery, and having a first end for communicating with the circulating device for discharging electrolyte therefrom, and a second end locatable at a selected level within the container to maintain by overflow a level of electrolyte inside the accumulator battery.

3. A lid according to claim 2, wherein the first device includes an upstanding cylindrical chamber, and wherein said second way comprises a tubular element slidably located in the chamber having an inner wall forming an annular area therebetween, said tubular element having a annular web for engaging the inner wall, said annular area having an upper area and a lower area separated from one another by said annular web, each having an opening to permit the inlet or the outlet of air under pressure, said openings for selectively permitting vertical displacement of said tubular element whenever said openings are fed by air under pressure acting against said annular web.

4. A lid according to claim 2 wherein said second device comprises a body adapted to be sealingly coupled within said second hole and having a cavity with a bottom, said body having one or more first ducts for exhaustion of fumes and one or more second ducts for the inlet of the re-fill liquid;

a tubular element having an outer tubular part extending within said cavity of said body and a cylindrical guiding element co-axial within said outer tubular part, said tubular element having a middle position, a transversal surface with a through hole and, laterally on the cylindrical wall, and one or more through openings communicating with at least one of said one or more second ducts;

a tubular stick slidingly coupled within said through hole of said transversal surface and having, at one end, a floating body for co-operating with liquid in the accumulator battery and, at the opposite end, a flexible membrane connected with said tubular stick through first sealingly locking means and connected with the inner lateral surface of said tubular element through second sealingly locking means, said tubular stick including centrally located closing means to sealingly co-operate within said hole of said transversal surface so as to selectively allow and to prevent the passage of re-fill liquid flowing from said one or more second ducts, said flexible membrane defining a discharge chamber, inside one side of said cavity of said body, which communicates with said one or more first ducts and with the end of said tubular stick and, on the opposite side, a build-up chamber for the collection of re-fill liquid which communicates with said one or more second ducts and within which the pressure of said liquid therein, causes the deformation of said membrane, thereby producing on said tubular stick a force such as to increase pressure exerted by said floating body against said closing means, wherein said build-up chamber communicates with a duct equipped with a capillary section joining an annular recess on the outer surface of said body, said annular recess defining, together with the wall of the hole lodging said device, an annular chamber which communicates with said tubular channel of said lid, said capillary section preventing the passage of electrolyte from the build-up chamber to said channel but permitting the passage of compressed air which is let into said second inlet duct of said device during re-charging of the accumulator battery.

5. A lid according to claim 4, wherein said pressure of said liquid contained inside said build-up chamber is such so as to exert on said membrane a force which is weaker than the total weight of said floating body and of said tubular stick supporting it.

6. A lid according to claim 4, wherein said tubular stick supporting said floating body has one or more through holes for the exhaustion of fumes, said through holes being arranged above said floating body.

7. A lid according to claim 4, wherein said tubular stick has external guiding fins slidingly coupling with the inner surface of a guiding element of said tubular element.

8. A lid according to claim 4, wherein said one or more first ducts are located opposite to one another on the same horizontal plane and two of said second ducts are located opposite to one another on a horizontal plane which is parallel with the plane on which said first ducts lie.

9. A lid (30) according to claim 4, wherein said closing means belonging to said tubular stick consist of a shutter in the shape of a truncated cone, suited to couple by interference within said through hole of said transversal surface.

10. A lid according to claim 4, wherein said transversal surface has a truncated-cone shape converging toward the interior of the accumulator battery.

* * * * *